United States Patent
Okui

(10) Patent No.: US 9,853,311 B2
(45) Date of Patent: Dec. 26, 2017

(54) FUEL CELL SYSTEM AND FUEL CELL POWERED VEHICLE

(71) Applicant: NISSAN MOTOR CO., LTD., Yokohama-shi, Kanagawa (JP)

(72) Inventor: Takehiko Okui, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 86 days.

(21) Appl. No.: 14/761,810

(22) PCT Filed: Dec. 9, 2013

(86) PCT No.: PCT/JP2013/082907
§ 371 (c)(1),
(2) Date: Jul. 17, 2015

(87) PCT Pub. No.: WO2014/115431
PCT Pub. Date: Jul. 31, 2014

(65) Prior Publication Data
US 2015/0357659 A1    Dec. 10, 2015

(30) Foreign Application Priority Data

Jan. 24, 2013   (JP) .................... 2013-011416

(51) Int. Cl.
*H01M 8/04291* (2016.01)
*H01M 8/04537* (2016.01)
(Continued)

(52) U.S. Cl.
CPC ....... *H01M 8/04291* (2013.01); *B60L 3/0053* (2013.01); *B60L 3/0069* (2013.01);
(Continued)

(58) Field of Classification Search
CPC ......... H01M 8/04291; H01M 8/04126; H01M 8/04611; H01M 8/04544; H01M 8/04664;
(Continued)

(56) References Cited

U.S. PATENT DOCUMENTS 6,638,650 B1 * 10/2003 Bailey ............... H01M 8/04007
429/432
2003/0022044 A1 * 1/2003 Inai ................... H01M 8/04089
429/432
(Continued)

FOREIGN PATENT DOCUMENTS

EP     1 279 940 A2   1/2003
JP     2003-45466 A   2/2003
(Continued)

OTHER PUBLICATIONS

Tang et al. "An experimental investigation of humidity and temperature effects on the mechanical properties of perfluorosulfonic acid membrane." Materials Science and Engineering A 425 (2006) 297-304, available Mar. 2006.*
(Continued)

*Primary Examiner* — Milton I Cano
*Assistant Examiner* — Michael Dignan
(74) *Attorney, Agent, or Firm* — Foley & Lardner LLP

(57) ABSTRACT

A fuel cell system includes: an external load connected to a fuel cell; an electric power adjusting unit configured to adjust a generated electric power of the fuel cell in accordance with electric power consumption of the external load; a humidity control unit configured to control humidity of an electrolyte membrane in the fuel cell on the basis of the generated electric power of the fuel cell; an output voltage detecting unit configured to detect an output voltage of the fuel cell; and a cross leakage determining unit configured to cause the humidity control unit to increase the humidity of
(Continued)

the electrolyte membrane when the fuel cell generates the electric power, the cross leakage determining unit being configured to determine whether a cross leakage amount increases or not on the basis of a change in the output voltage at that time.

8 Claims, 15 Drawing Sheets

(51) Int. Cl.
*B60L 3/00* (2006.01)
*B60L 11/18* (2006.01)
*H01M 8/04828* (2016.01)
*H01M 8/04858* (2016.01)
*H01M 8/04119* (2016.01)
*H01M 8/04492* (2016.01)
*H01M 8/04664* (2016.01)
*H01M 8/1018* (2016.01)

(52) U.S. Cl.
CPC ....... *B60L 11/1883* (2013.01); *B60L 11/1898* (2013.01); *H01M 8/0485* (2013.01); *H01M 8/04126* (2013.01); *H01M 8/04529* (2013.01); *H01M 8/04544* (2013.01); *H01M 8/04552* (2013.01); *H01M 8/04611* (2013.01); *H01M 8/04664* (2013.01); *H01M 8/04865* (2013.01); *H01M 8/04925* (2013.01); *H01M 2008/1095* (2013.01); *H01M 2250/20* (2013.01); *Y02T 90/32* (2013.01); *Y02T 90/34* (2013.01)

(58) Field of Classification Search
CPC ......... H01M 8/04529; H01M 8/04865; H01M 8/04925; H01M 8/04552; H01M 8/0485; H01M 2250/20; H01M 2008/1095; B60L 3/0053; B60L 11/1883; B60L 11/1898; B60L 3/0069; Y02T 90/32; Y02T 90/34
See application file for complete search history.

(56) References Cited

U.S. PATENT DOCUMENTS

| 2006/0286420 | A1* | 12/2006 | Koyama | ........... H01M 8/04559 |
| | | | | 429/432 |
| 2008/0038594 | A1* | 2/2008 | Lai | .................... H01M 8/04126 |
| | | | | 429/413 |
| 2013/0164645 | A1* | 6/2013 | Takaichi | ........... H01M 8/04552 |
| | | | | 429/432 |

FOREIGN PATENT DOCUMENTS

| JP | 2005-197211 A | | 7/2005 | |
| JP | 2006-73351 A | | 3/2006 | |
| JP | 2011-124132 A | | 6/2011 | |
| WO | WO 2012/056866 | * | 5/2012 | ............. H01M 8/10 |

OTHER PUBLICATIONS

Ingrimundarson et al. "Model-based detection of hydrogen leaks in a fuel cell stack." IEEE Transactions on Control Systems Technology, vol. 16, No. 5, 1004-1012, available Sep. 2008.*
Hiramitsu et al. "Influence of Humidification on Deterioration of Gas Diffusivity in Catalyst Layer on Polymer Electrolyte Fuel Cell" Journal of Power Sources 195 (2010) 435-444, available Jul. 2009.*

* cited by examiner

FUEL CELL SYSTEM AND FUEL CELL POWERED VEHICLE

CROSS REFERENCE TO RELATED APPLICATION

The present application claims priority based on Japanese Patent Application No. 2013-11416, filed with the Japan Patent Office on Jan. 24, 2013, the entire content of which is expressly incorporated herein by reference.

TECHNICAL FIELD

The present invention relates to a fuel cell system and a fuel cell powered vehicle.

BACKGROUND ART

JP2006-73351A discloses a conventional fuel cell system in which it is determined whether a flow rate of an anode gas that leaks out from anode gas flow passages to cathode gas flow passages through an electrolyte membrane (hereinafter, referred to as a "cross leakage amount") increases or not on the basis of an open circuit voltage difference that was measured when a humidifying amount of a reactant gas to be supplied to a fuel cell is lowered.

SUMMARY OF THE INVENTION

However, since the conventional fuel cell system described above detects an increase in the cross leakage amount on the basis of the open circuit voltage difference, a current cannot be taken out from the fuel cell during the detection and the increase in the cross leakage amount cannot be detected during power generation of the fuel cell. On the other hand, in a case where an increase in the cross leakage amount is to be detected during power generation of the fuel cell, it is required to complete the determination in a short time in view of a load variation of the fuel cell.

The present invention was made by focusing such a problem, and it is an object of the present invention to detect an increase in a cross leakage amount in a short time during power generation of a fuel cell.

According to an aspect of the present invention, there is provided a fuel cell system adapted to generate an electric power by supplying an anode gas and a cathode gas to a fuel cell, the fuel cell system including: an external load connected to the fuel cell; an electric power adjusting unit configured to adjust the generated electric power of the fuel cell in accordance with electric power consumption of the external load; a humidity control unit configured to control humidity of an electrolyte membrane in the fuel cell on the basis of the generated electric power of the fuel cell; an output voltage detecting unit configured to detect an output voltage of the fuel cell; and a cross leakage determining unit configured to cause the humidity control unit to increase the humidity of the electrolyte membrane when the fuel cell generates the electric power, the cross leakage determining unit being configured to determine whether a cross leakage amount increases or not on the basis of a change in the output voltage at that time.

DESCRIPTION OF THE EMBODIMENTS

Hereinafter, each of embodiments of the present invention will be described with reference to the accompanying drawings and the like.

First Embodiment

In a fuel cell, an electrolyte membrane is sandwiched between an anode electrode (fuel electrode) and a cathode electrode (oxidant electrode), and electric power is generated by supplying an anode gas (fuel gas) containing hydrogen to the anode electrode and supplying a cathode gas (oxidant gas) containing oxygen to the cathode electrode. Electrode reactions that proceed on both the anode electrode and the cathode electrode are as follows.

Anode Electrode: $2H_2 \rightarrow 4H^+ + 4e^-$     (1)

Cathode Electrode: $4H^+ + 4e^- + O_2 \rightarrow 2H_2O$ (2)

The fuel cell generates an electromotive force of about one volt by means of these electrode reactions (1) and (2).

Figure 1:
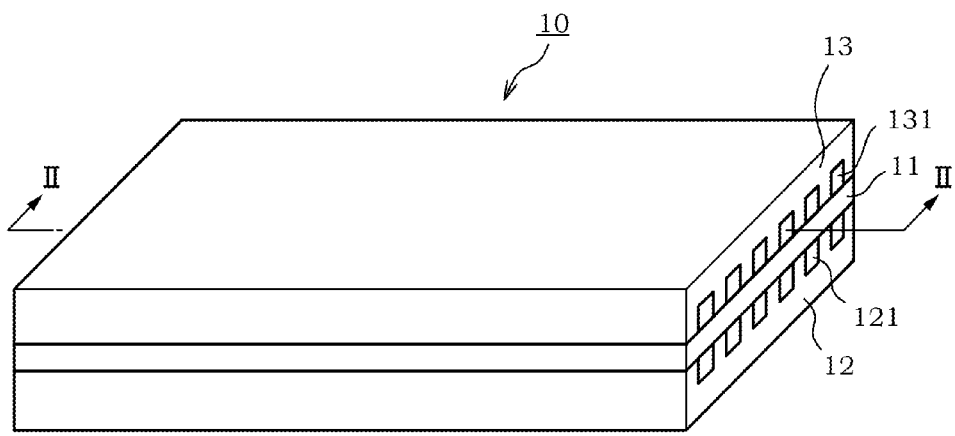
FIG. 1 is a schematic perspective view of a fuel cell according to a first embodiment of the present invention.
Figure 2:
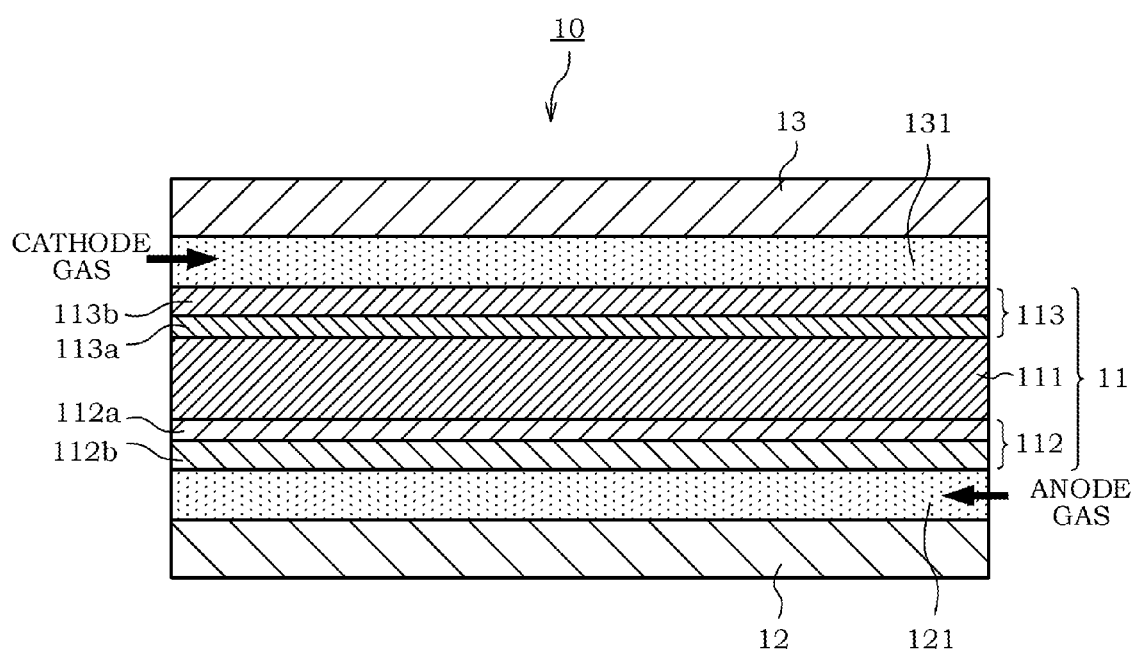
FIG. 2 is a cross-sectional view of the fuel cell in FIG. 1 taken along II-II.

FIG. 1 and FIG. 2 are views explaining a configuration of a fuel cell 10 according to one embodiment of the present invention. FIG. 1 is a schematic perspective view of the fuel cell 10. FIG. 2 is a cross-sectional view of the fuel cell 10 in FIG. 1 taken along II-II.

The fuel cell 10 is configured by arranging an anode separator 12 and a cathode separator 13 on both front and back surfaces of an MEA 11.

The MEA 11 includes an electrolyte membrane 111, an anode electrode 112, and a cathode electrode 113. The MEA 11 has the anode electrode 112 and the cathode electrode 113 on one surface and the other surface of the electrolyte membrane 111, respectively.

The electrolyte membrane 111 is a proton conductive ion exchange membrane formed of fluorine-based resin. The electrolyte membrane 111 exhibits good electrical conductivity in a wet state.

The anode electrode 112 includes a catalyst layer 112a and a gas diffusion layer 112b. The catalyst layer 112a is in contact with the electrolyte membrane 111. The catalyst layer 112a is formed of platinum or carbon black particles supporting platinum or the like. The gas diffusion layer 112b is provided on an outer side (a side opposite to the electrolyte membrane 111) of the catalyst layer 112a, and is in contact with the anode separator 12. The gas diffusion layer 112b is formed of a member having a sufficient gas diffusion characteristic and electric conductivity. The gas diffusion layer 112b is formed of a carbon cloth formed by weaving fibers made of a carbon fiber, for example.

The cathode electrode 113 also includes a catalyst layer 113a and a gas diffusion layer 113b as well as the anode electrode 112.

The anode separator 12 is in contact with the gas diffusion layer 112b. The anode separator 12 includes a plurality of groove-like anode gas flow passages 121 for supplying the anode gas to the anode electrode 112.

The cathode separator 13 is in contact with the gas diffusion layer 113b. The cathode separator 13 includes a plurality of groove-like cathode gas flow passages 131 for supplying the cathode gas to the cathode electrode 113.

The anode gas flowing through the anode gas flow passages 121 and the cathode gas flowing the cathode gas flow passages 131 flow in parallel with each other in directions opposite to each other. It may be configured so that they flow in parallel with each other in the same direction.

In a case where such a fuel cell 10 is utilized as a power source for a vehicle, the electric power to be required becomes greater. For this reason, the fuel cells 10 are used as a fuel cell stack 1 in which several hundreds of the fuel cells 10 are laminated. Then, by constituting a fuel cell system 100 for supplying the anode gas and the cathode gas to the fuel cell stack 1, an electric power for driving a vehicle is taken out.

Figure 3:
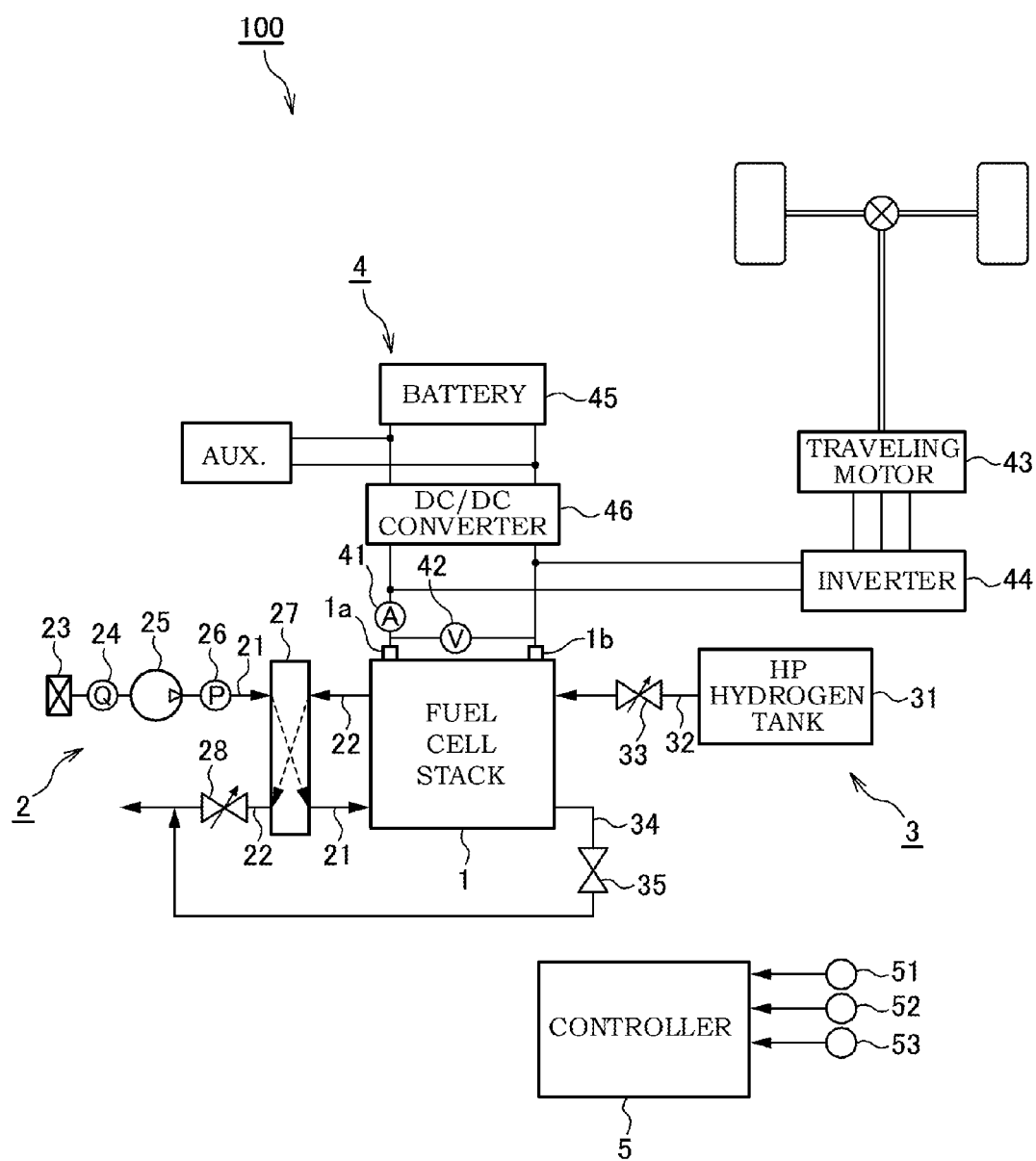
FIG. 3 is a schematic configuration view of an anode gas non-circulating type of fuel cell system according to the first embodiment of the present invention.

FIG. 3 is a schematic configuration view of the fuel cell system 100 according to a first embodiment of the present invention.

The fuel cell system 100 includes the fuel cell stack 1, a cathode gas supply/discharge device 2, an anode gas supply/discharge device 3, an electric power system 4, and a controller 5.

The fuel cell stack 1 is constructed by stacking a plurality of fuel cells 10, and receives the supply of the anode gas and the cathode gas to generate an electric power necessary for driving of the vehicle. The fuel cell stack 1 includes an anode electrode side output terminal 1a and a cathode electrode side output terminal 1b as terminals for taking out an electric power.

The cathode gas supply/discharge device 2 includes a cathode gas supply passage 21, a cathode gas discharge passage 22, a filter 23, an air flow sensor 24, a cathode compressor 25, a cathode pressure sensor 26, a water recovery device (Water Recovery Device; hereinafter, referred to as a "WRD") 27, and a cathode regulating valve 28. The cathode gas supply/discharge device 2 supplies cathode gas to the fuel cell stack 1, and discharges cathode off-gas discharged from the fuel cell stack 1 to an outside air.

The cathode gas supply passage 21 is a passage in which the cathode gas to be supplied to the fuel cell stack 1 flows. One end of the cathode gas supply passage 21 is connected to the filter 23, and the other end thereof is connected to a cathode gas inlet port of the fuel cell stack 1.

The cathode gas discharge passage 22 is a passage in which the cathode off-gas discharged from the fuel cell stack 1 flows. One end of the cathode gas discharge passage 22 is connected to a cathode gas outlet port of the fuel cell stack 1, and the other end thereof becomes an open end. The cathode off-gas is a mixture gas of the cathode gas and steam generated by an electrode reaction.

The filter 23 removes foreign matter in the cathode gas to be taken in the cathode gas supply passage 21.

The air flow sensor 24 is provided on the cathode gas supply passage 21 upstream from the cathode compressor 25. The air flow sensor 24 detects a flow rate of the cathode gas that is supplied to the cathode compressor 25 and is then supplied to the fuel cell stack 1 finally.

The cathode compressor 25 is provided on the cathode gas supply passage 21. The cathode compressor 25 takes air (outside air) in the cathode gas supply passage 21 as the cathode gas via the filter 23, and supplies the air to the fuel cell stack 1.

The cathode pressure sensor 26 is provided on the cathode gas supply passage 21 between the cathode compressor 25 and the WRD 27. The cathode pressure sensor 26 detects pressure of the cathode gas in the vicinity of a cathode gas inlet port of the WRD 27. Hereinafter, a detected value of this cathode pressure sensor 26 is referred to as "detected cathode pressure".

The WRD 27 is connected to each of the cathode gas supply passage 21 and the cathode gas discharge passage 22 to collect moisture in the cathode off-gas flowing in the cathode gas discharge passage 22. The WRD 27 humidifies the cathode gas flowing in the cathode gas supply passage 21 using the collected moisture.

The cathode regulating valve 28 is provided on the cathode gas discharge passage 22 downward from the WRD 27. Opening and closing of the cathode regulating valve 28 is controlled by the controller 5 to adjust a pressure of the cathode gas to be supplied to the fuel cell stack 1 at a desired pressure.

The anode gas supply/discharge device 3 supplies the anode gas to the fuel cell stack 1, and discharges an anode off-gas discharged from the fuel cell stack 1 to the cathode gas discharge passage 22. The anode gas supply/discharge device 3 includes a high-pressure hydrogen tank 31, an anode gas supply passage 32, an anode pressure regulating valve 33, an anode gas discharge passage 34, and a purge valve 35.

The high-pressure hydrogen tank 31 keeps and stores the anode gas to be supplied to the fuel cell stack 1 in a high-pressure state.

The anode gas supply passage 32 is a passage to supply the anode gas discharged from the high-pressure hydrogen tank 31 to the fuel cell stack 1. One end of the anode gas supply passage 32 is connected to the high-pressure hydrogen tank 31, and the other end thereof is connected to an anode gas inlet port of the fuel cell stack 1.

The anode pressure regulating valve 33 is provided on the anode gas supply passage 32. Opening and closing of the anode pressure regulating valve 33 is controlled by the controller 5 to adjust a pressure of the anode gas to be supplied to the fuel cell stack 1 to a desired pressure.

The anode gas discharge passage 34 is a passage in which the anode off-gas discharged from the fuel cell stack 1 flows. One end of the anode gas discharge passage 34 is connected to an anode gas outlet port of the fuel cell stack 1, and the other end thereof is connected to the cathode gas discharge passage 22.

The anode off-gas discharged to the cathode gas discharge passage 22 via the anode gas discharge passage 34 is mixed with the cathode off-gas in the cathode gas discharge passage 22, and is discharged to the outside of the fuel cell system 100. Excess hydrogen that is not used in the electrode reaction is contained in the anode off-gas. Therefore, by mixing the excess hydrogen with the cathode off-gas and then discharging it to the outside of the fuel cell system 100, hydrogen concentration in the discharge gas is set to become a predetermined concentration or lower.

The purge valve 35 is provided on the anode gas discharge passage 34. Opening and closing of the purge valve 35 is controlled by the controller 5 to control a flow rate of the anode off-gas to be discharged from the anode gas discharge passage 34 to the cathode gas discharge passage 22.

The electric power system 4 includes a current sensor 41, a voltage sensor 42, a traveling motor 43, an inverter 44, a battery 45, and a DC/DC convertor 46.

The current sensor 41 detects a current taken out from the fuel cell stack 1 (hereinafter, referred to as an "output current").

The voltage sensor 42 detects an inter-terminal voltage between the anode electrode side output terminal 1a and the cathode electrode side output terminal 1b (hereinafter, referred to as an "output voltage"). Further, it is still better to be capable of detecting a voltage of one piece of the fuel cell 10 constituting the fuel cell stack 1. Moreover, it may be configured so that a voltage can be detected every plural fuel cells 10.

The traveling motor 43 is a three-phase synchronous motor in which permanent magnets are embedded in a rotor and a stator coil is wound around a stator. The traveling motor 43 has a function as an electric motor that receives supply of the electric power from the fuel cell stack 1 and the battery 45 to be rotatably driven, and a function as a power generator that generates an electromotive force between both ends of the stator coil at the time of deceleration of the vehicle in which the rotor is caused to rotate by means of an external force.

The inverter 44 is configured by a plurality of semiconductor switches, such as an IGBT (Insulated Gate Bipolar Transistor), for example. Opening and closing of each of the semiconductor switches in the inverter 44 is controlled by the controller 5 to convert a DC electric power to an AC electric power or convert an AC electric power to a DC electric power. When the traveling motor 43 is caused to function as an electric motor, the inverter 44 converts a composite DC electric power of the electric power generated by the fuel cell stack 1 and the electric power outputted from the battery 45 into a three-phase AC electric power to supply the three-phase AC electric power to the traveling motor 43. On the other hand, when the traveling motor 43 is caused to function as a power generator, the inverter 44 converts a regenerative electric power of the traveling motor 43 (three-phase AC electric power) into a DC electric power to supply the DC electric power to the battery 45.

An excess value of the generated electric power of the fuel cell stack 1 (the output current×the output voltage) and a regenerative electric power of the traveling motor 43 are charged in the battery 45. The electric power charged in the battery 45 is supplied to auxiliary machines such as the cathode compressor 25 and the traveling motor 43 if necessary.

The DC/DC convertor 46 is a bidirectional voltage converter that raises or drops the output voltage of the fuel cell stack 1. The DC/DC convertor 46 controls the output voltage of the fuel cell stack 1, whereby the output current of the fuel cell stack 1 is controlled, and the generated electric power is controlled furthermore.

The controller 5 is configured by a microcomputer that includes a Central Processing Unit (CPU), a Read Only Memory (ROM), a Random Access Memory (RAM) and an input/output interface (I/O interface).

Various kinds of signals for detecting an operation state of the fuel cell system 100 are inputted to the controller 5 in addition to signals of the air flow sensor 24, the cathode pressure sensor 26, the current sensor 41, and the voltage sensor 42 described above. The signals include signals of: an accelerator stroke sensor 51 for detecting a pressing amount of an accelerator pedal (hereinafter, referred to as an "accelerator operating amount"); a rotational speed sensor 52 for detecting a rotational speed of the cathode compressor 25; a water temperature sensor 53 for detecting temperature of cooling water used to cool the fuel cell stack 1 (hereinafter, referred to as "stack temperature"); and the like.

The controller 5 calculates a target output current of the fuel cell stack 1 on the basis of the operation state of the fuel cell system 100. More specifically, the controller 5 calculates the target output current of the fuel cell stack 1 on the basis of electric power consumption of the auxiliary machines, such as the traveling motor 43, the cathode compressor 25 and the like. The controller 5 then controls the output voltage of the fuel cell stack 1 by means of the DC/DC convertor 46 so that the output current of the fuel cell stack 1 becomes the target output current, and supplies necessary electric power to the traveling motor 43 and the auxiliary machines.

Further, the controller 5 refers to a table of FIG. 4, and calculates a target value (hereinafter, referred to as a "target HFR") of an internal high-frequency resistance (High Frequency Resistance; hereinafter, referred to as an "HFR") of the fuel cell stack 1 on the basis of the output current of the fuel cell stack 1. There is a correlation relationship between humidity (water content) of the electrolyte membrane 111 and the HFR. Then, the controller 5 feedback-controls the rotational speed of the cathode compressor 25, an opening degree of the cathode regulating valve 28, and a rotational speed of a cooling water pump (not shown in the drawings) configured to control a flow rate of the cooling water for cooling the fuel cell stack 1, so that the HFR of the fuel cell stack 1 becomes the target HFR.

Figure 4:
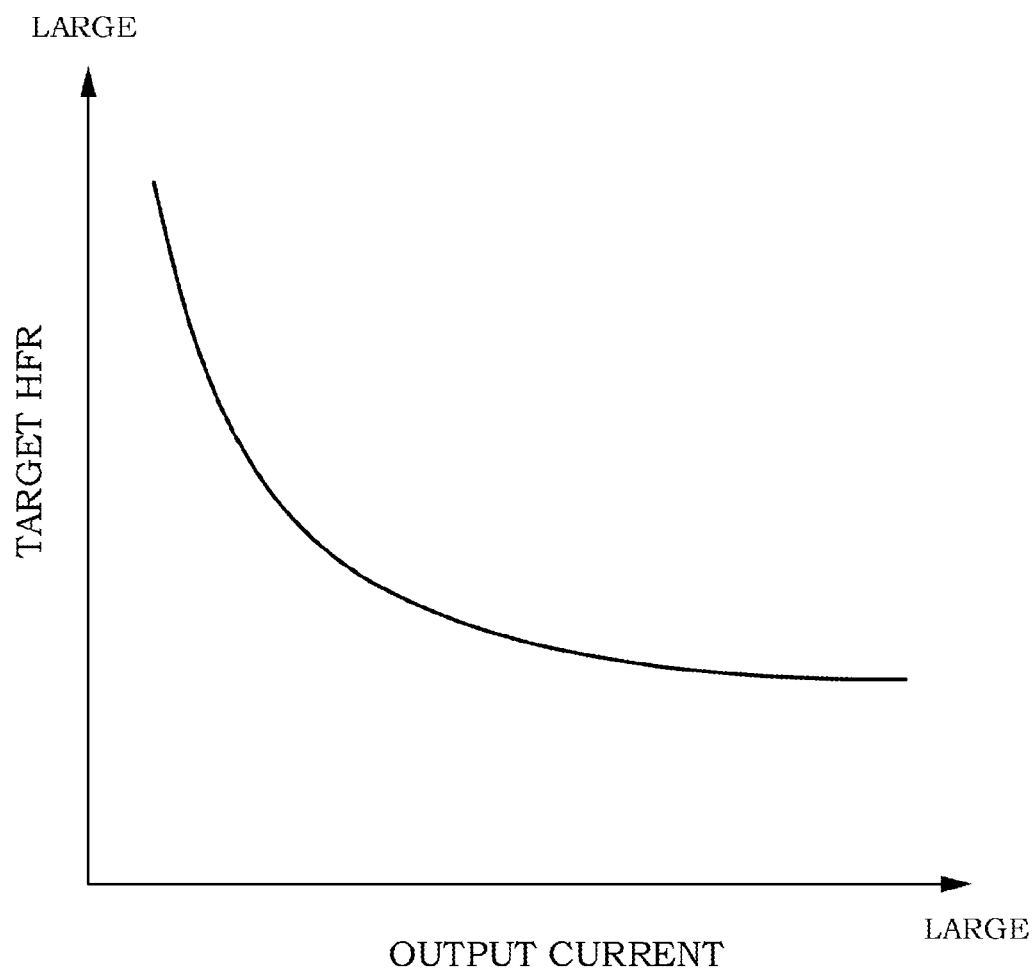
FIG. 4 is a table used when a target HFR is calculated on the basis of a target output current of a fuel cell stack.

In this regard, as shown in FIG. 4, in the present embodiment, the controller 5 controls the fuel cell stack 1 so that the larger an output current of the fuel cell stack 1 becomes, the lower the HFR of the fuel cell stack 1 becomes, that is, the larger the humidity of the electrolyte membrane 111 becomes.

Figure 5:
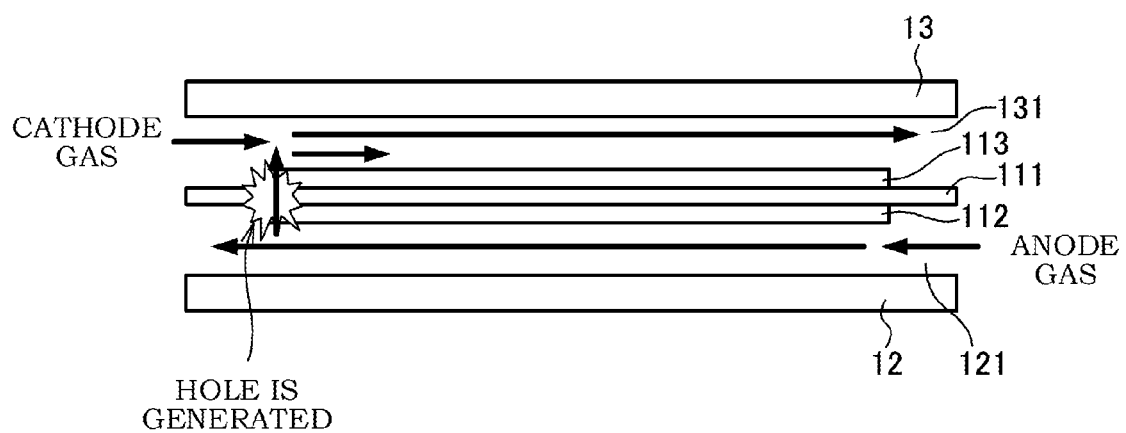
FIG. 5 is a view showing a state where a hole is generated in an electrolyte membrane.

Here, when the MEA 11 is deteriorated to generate a hole in the electrolyte membrane 111, for example, as shown in FIG. 5, a flow rate of the anode gas that leaks out from the anode gas flow passages 121 to the cathode gas flow passages 131 through the MEA 11 (hereinafter, referred to as a "cross leakage amount") increases compared with that before deterioration of the MEA 11. When the cross leakage amount increases, anode gas concentration (the hydrogen concentration) in the cathode off-gas discharged from the cathode gas discharge passage 22 increases. For this reason, there is need to stop the power generation of the fuel cell stack 1 in the worst case. Therefore, it is required to detect an increase in the cross leakage amount early and accurately.

However, in a case where an increase in the cross leakage amount is detected only in no power generation state (that is, a state where the output voltage becomes the open circuit voltage (OCV: Open Circuit Voltage)) in which no current is taken out from the fuel cell stack 1, it is impossible to detect the increase in the cross leakage amount during the power generation of the fuel cell stack 1. In that case, it is impossible to detect the increase in the cross leakage amount during vehicle traveling during which many load variations occur. For that reason, it is impossible to detect the increase in the cross leakage amount early.

Therefore, in the present embodiment, even in a power generation state in which a current is taken out from the fuel cell stack 1, it is possible to detect an increase in the cross leakage amount in a short time, whereby it is possible to detect an increase in the cross leakage amount early.

Hereinafter, an increase detecting control of the cross leakage amount according to the present embodiment will be described.

Figure 6:
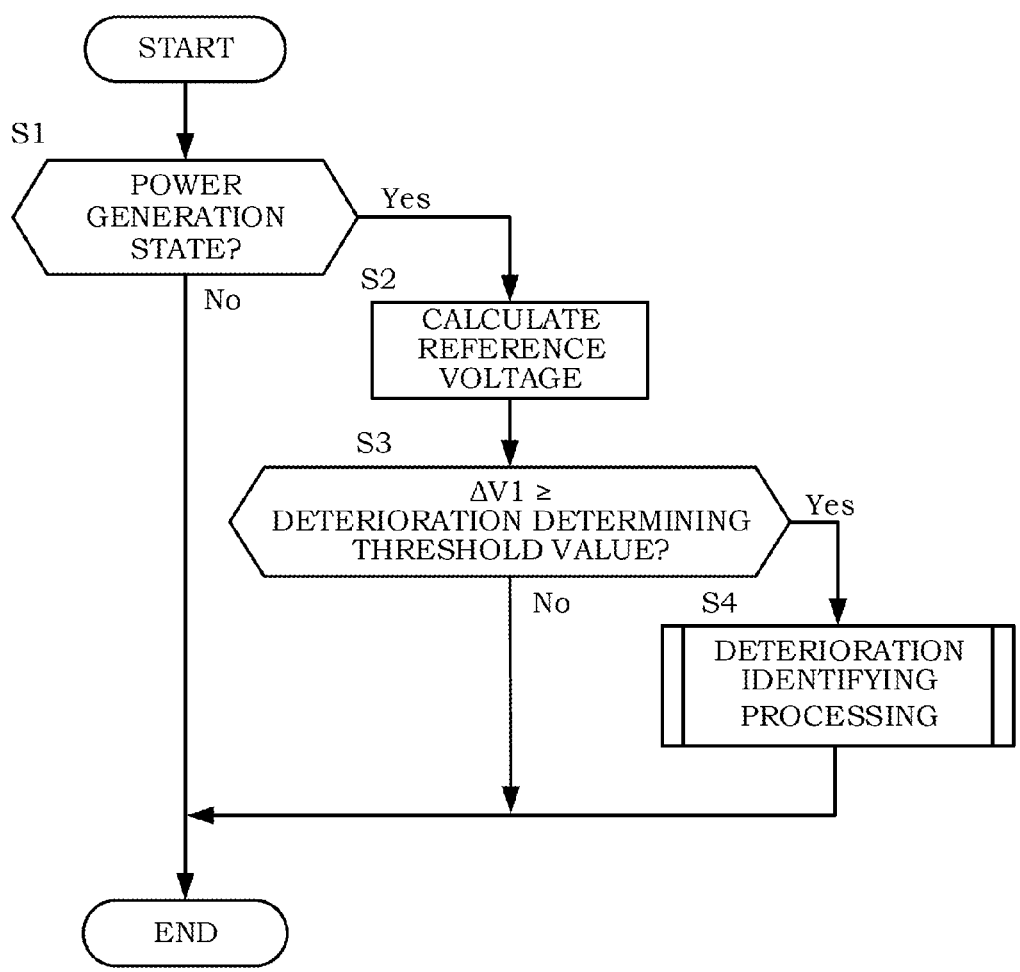
FIG. 6 is a flowchart for explaining an increase detecting control of a cross leakage amount according to the first embodiment of the present invention.

FIG. 6 is a flowchart for explaining an increase detecting control of the cross leakage amount according to the present embodiment.

At Step S1, the controller 5 determines whether or not the fuel cell stack 1 is in a power generation state in which a current is taken out from the fuel cell stack 1. More specifically, the controller 5 determines whether the fuel cell stack 1 is in the power generation state or not on the basis of a value of the output current. In a case where the current is taken out from the fuel cell stack 1, the controller 5 carries out processing at Step S2. In a case where the current is not taken out from the fuel cell stack 1, the controller 5 terminates the processing this time.

At Step S2 and Step S3, the controller 5 first determines whether the MEA 11 is deteriorated or not. Hereinafter, a method of determining deterioration of the MEA 11 will be described with reference to FIG. 7, and the content of each step will then be described.

Figure 7:
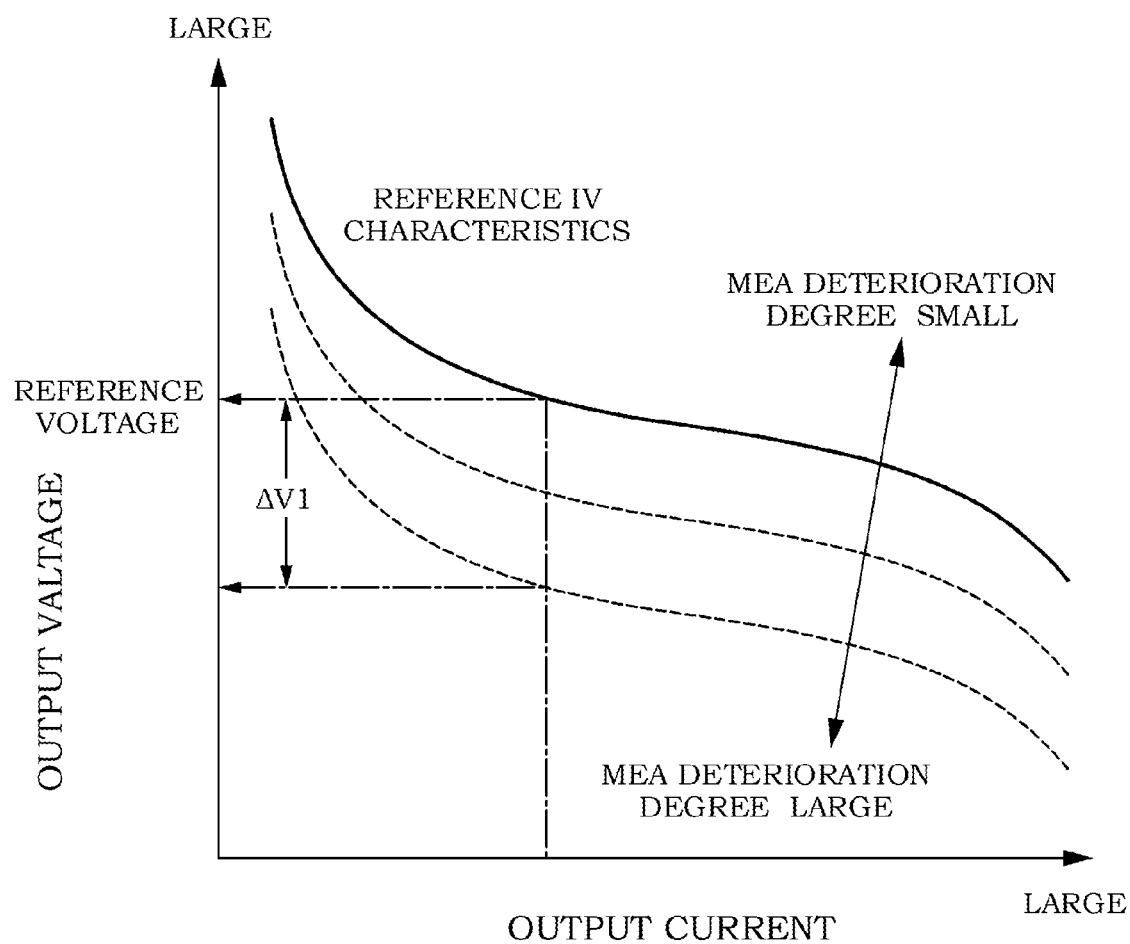
FIG. 7 is a view showing a state of IV characteristics for the fuel cell stack, which varies in accordance with a degree of deterioration of an MEA.

FIG. 7 is a view showing a state of IV characteristics for the fuel cell stack 1, which varies in accordance with a degree of deterioration of the MEA 11. In FIG. 7, IV characteristics of the fuel cell stack 1 in an initial state before the MEA 11 is deteriorated (hereinafter, referred to as "reference IV characteristics") is shown by a solid line.

When the MEA 11 is deteriorated, a catalyst surface area of the catalyst layers 112a, 113a decreases, for example, other than the case a hole or the like is generated in the electrolyte membrane 111 and the cross leakage amount thereby increases as described above. In a case where the cross leakage amount increases or the surface area of the catalyst in the catalyst layers 112a, 113a decreases, an activation overvoltage increases, the IV characteristics of the fuel cell stack 1 are deteriorated compared with the reference IV characteristics, and a power generation efficiency is lowered.

Namely, as shown in FIG. 7, even though the output current with the same value is taken out from the fuel cell stack 1, the output voltage at that time becomes lower as the degree of deterioration of the MEA 11 becomes larger. In other words, as the degree of deterioration of the MEA 11 becomes larger, a voltage difference between a reference voltage (an output voltage obtained by the reference IV characteristics) and an actual output voltage (hereinafter, referred to as a "voltage drop amount") $\Delta V1$ becomes larger.

Therefore, in the present embodiment, it is first determined whether the MEA 11 is deteriorated or not by determining whether the voltage drop amount $\Delta V1$ is a predetermined deterioration determining threshold value or more. Thus, it is determined whether there is a possibility that the cross leakage amount increases.

Figure 8:
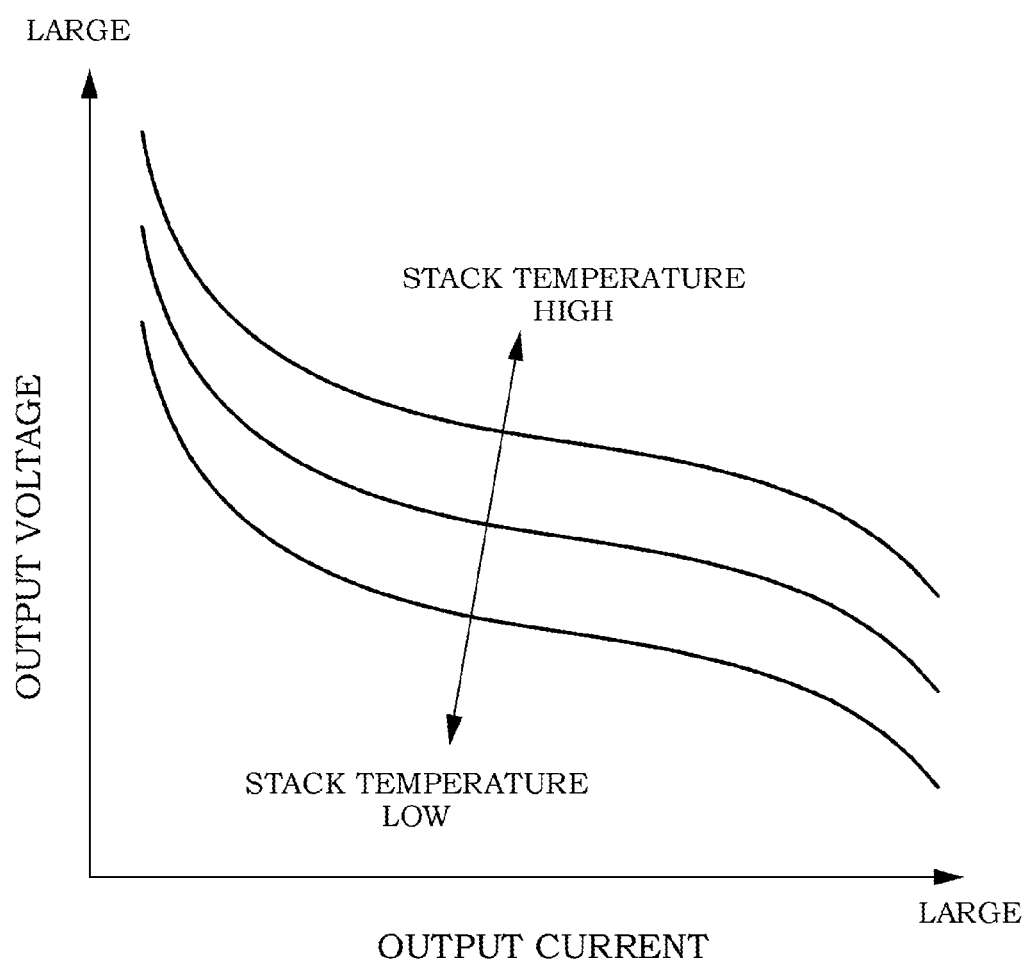
FIG. 8 is a map used when a reference voltage is calculated on the basis of a current output current and stack temperature.

At Step S2, the controller 5 refers to a map of FIG. 8, and calculates the reference voltage on the basis of a current output current and stack temperature. The map of FIG. 8 shows the reference IV characteristics according to stack temperature, which are calculated in advance by conformity such as experiments.

At Step S3, the controller 5 determines whether the voltage drop amount $\Delta V1$ is the predetermined deterioration determining threshold value or more. In a case where the voltage drop amount $\Delta V1$ is less than the deterioration determining threshold value, the controller 5 determines that the MEA 11 is not deteriorated and there is in particular no possibility that the cross leakage amount increases. The controller 5 then terminates the processing this time. On the other hand, in a case where the voltage drop amount $\Delta V1$ is the deterioration determining threshold value or more, the controller 5 determines that there is a possibility that the MEA 11 is deteriorated and the cross leakage amount increases, and carries out processing at Step S4.

At Step S4, the controller 5 carries out deterioration identifying processing. This is because of the following reasons. By determining whether or not the voltage drop amount $\Delta V1$ becomes the predetermined deterioration determining threshold value or more, it is possible to determine whether the MEA 11 is deteriorated or not. However, it is impossible to determine whether a factor is due to an increase in the cross leakage amount or a decrease in the surface area of the catalyst in the catalyst layers 112a, 113a only by determining whether or not the voltage drop amount $\Delta V1$ becomes the deterioration determining threshold value or more. Thus, the deterioration identifying processing is carried out at this time.

Therefore, in the present embodiment, in a case where the voltage drop amount $\Delta V1$ becomes the deterioration determining threshold value or more it is further identified whether the factor is due to the increase in the cross leakage amount or not by changing humidity of the electrolyte membrane 111 (the HFR of the fuel cell stack 1).

Hereinafter, reasons why the factor, by which the voltage drop amount $\Delta V1$ becomes the deterioration determining threshold value or more, can be identified due to the increase in the cross leakage amount or the decrease in the catalyst surface area of the catalyst layers 112a, 113a by changing the humidity of the electrolyte membrane 111 will be described, and then, the concrete content of the deterioration identifying processing will be described with reference to FIG. 9.

In a case where a hole is generated in the electrolyte membrane 111 due to deterioration of the MEA 11, a size of the hole varies in response to humidity of the electrolyte membrane 111. More specifically, in a case where the humidity of the electrolyte membrane 111 becomes larger, a hole in the electrolyte membrane 111 becomes smaller compared with a case where the humidity of the electrolyte membrane 111 is smaller. Namely, a hole in the electrolyte membrane 111 becomes smaller in a case where the electrolyte membrane 111 is wet and the HFR becomes relatively low compared with a case where the electrolyte membrane 111 is dry and the HFR becomes relatively high. This is because the electrolyte membrane 111 swells to close the hole when the humidity of the electrolyte membrane 111 becomes larger.

For that reason, the humidity of the electrolyte membrane 111 is changed from a small state to a large state. Thus, the electrolyte membrane 111 swells to close the hole, whereby the cross leakage amount decreases.

In a case where a hole is generated in the electrolyte membrane 111 and the IV characteristics of the fuel cell stack 1 is lowered due to the increase in the cross leakage amount, the hole is closed to decrease the cross leakage amount by changing the electrolyte membrane 111 from the dry state to the wet state. Therefore, the IV characteristics are recovered and the output voltage becomes remarkably high. On the other hand, in a case where the IV characteristics of the fuel cell stack 1 is lowered due to a decrease in the surface area of the catalyst in the catalyst layers 112a, 113a, the surface area of the catalyst in the catalyst layers 112a, 113a cannot be returned to the state before deterioration even though the electrolyte membrane 111 is changed from the dry state to the wet state. For that reason, by changing the electrolyte membrane 111 from the dry state to the wet state, the IV characteristics rise to the same extent as a case where there is no deterioration in the MEA 11. However, its rise margin is sufficiently smaller than that in a case where the cross leakage amount increases.

Therefore, in the present embodiment, in a case where the voltage drop amount $\Delta V1$ becomes the deterioration determining threshold value or more, it is identified whether the factor is due to the increase in the cross leakage amount or not by detecting a change amount of the output voltage when to change the humidity of the electrolyte membrane 111 (the HFR of the fuel cell stack 1).

Figure 9:
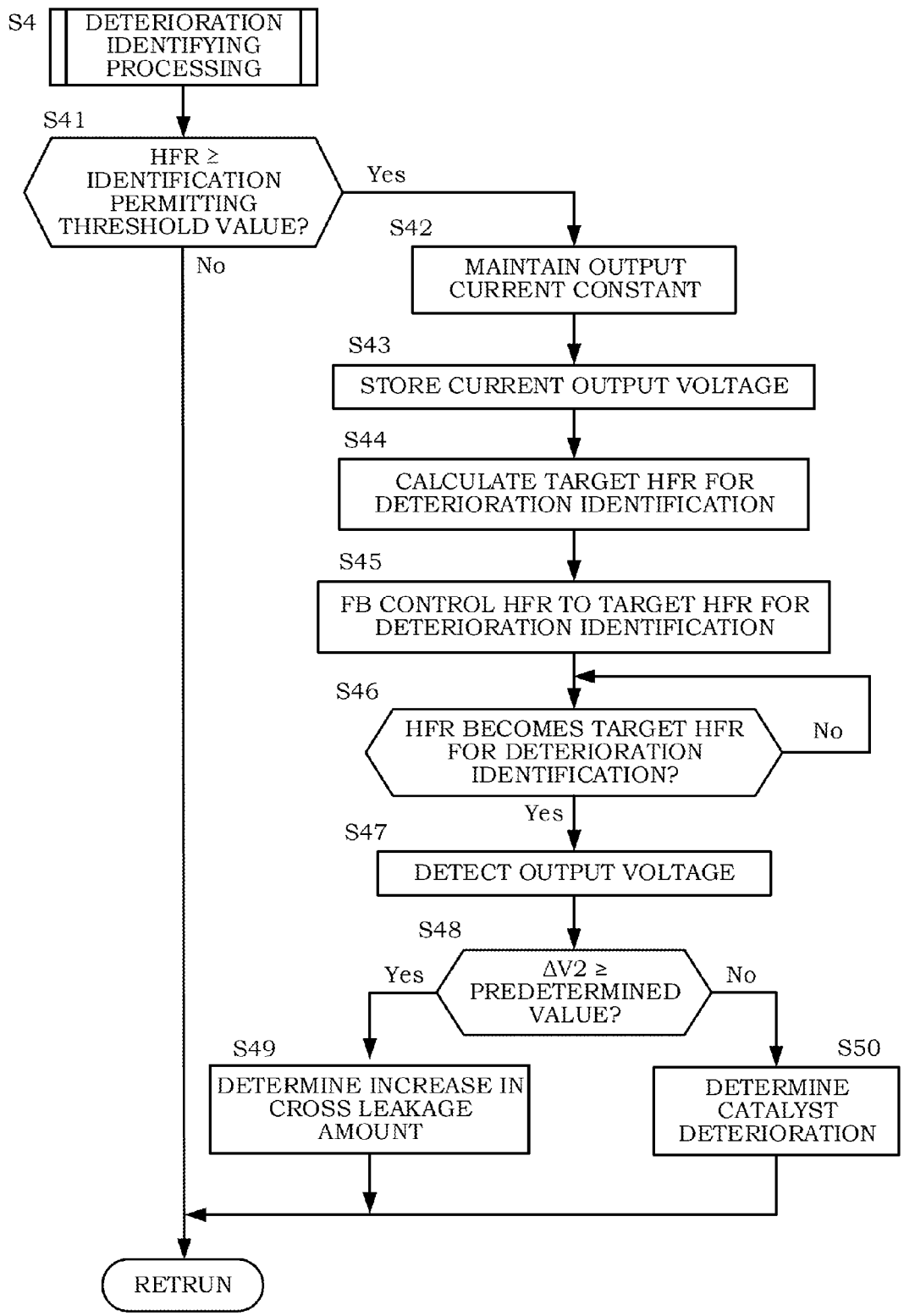
FIG. 9 is a flowchart for explaining the content of deterioration identifying processing.

FIG. 9 is a flowchart for explaining the content of the deterioration identifying processing.

At Step S41, the controller 5 determines whether the humidity of the electrolyte membrane 111 is small, the electrolyte membrane 111 is dry and the hole in the electrolyte membrane 111 is closed or not. More specifically, the controller 5 determines whether or not the HFR of the fuel cell stack 1 is a predetermined identification permitting threshold value or more.

In a case where the HFR of the fuel cell stack 1 is less than the identification permitting threshold value, the controller 5 terminates the processing this time. This is because there is a fear that the factor, by which the voltage drop amount $\Delta V1$ becomes the deterioration determining threshold value or more, cannot be identified accurately due to the fact that the electrolyte membrane 111 has already swelled to close the hole to the extent and a change in the output voltage when to change the humidity thereby becomes smaller. On the other hand, in a case where the HFR of the fuel cell stack 1 is the identification permitting threshold value or more, the controller 5 carries out processing at Step S42. This is because the electrolyte membrane 111 becomes dry and sufficient identification accuracy can be secured by changing humidity.

At Step S42, the controller 5 sets the output current of the fuel cell stack 1 to the current output current and maintains the output current constant. A variation part of the load while maintaining the output current constant is handled by charge or discharge of the battery 45. More specifically, in a case where the generated electric power becomes excessive due to the load variation, an excess value is charged in the battery 45. On the other hand, in a case where the generated electric power runs short due to the load variation, the shortage is compensated by the electric power of the battery 45.

At Step S43, the controller 5 detects and stores a current output voltage, that is, an output voltage before the HFR of the fuel cell stack 1 is controlled to a target HFR for deterioration identification (will be described later) (hereinafter, referred to as "the output voltage before the deterioration identifying processing"). In other words, this output voltage before the deterioration identifying processing is an output voltage when the HFR of the fuel cell stack 1 is controlled to a target HFR at normal time calculated on the basis of an output current by referring to the table of FIG. 4.

Figure 10:
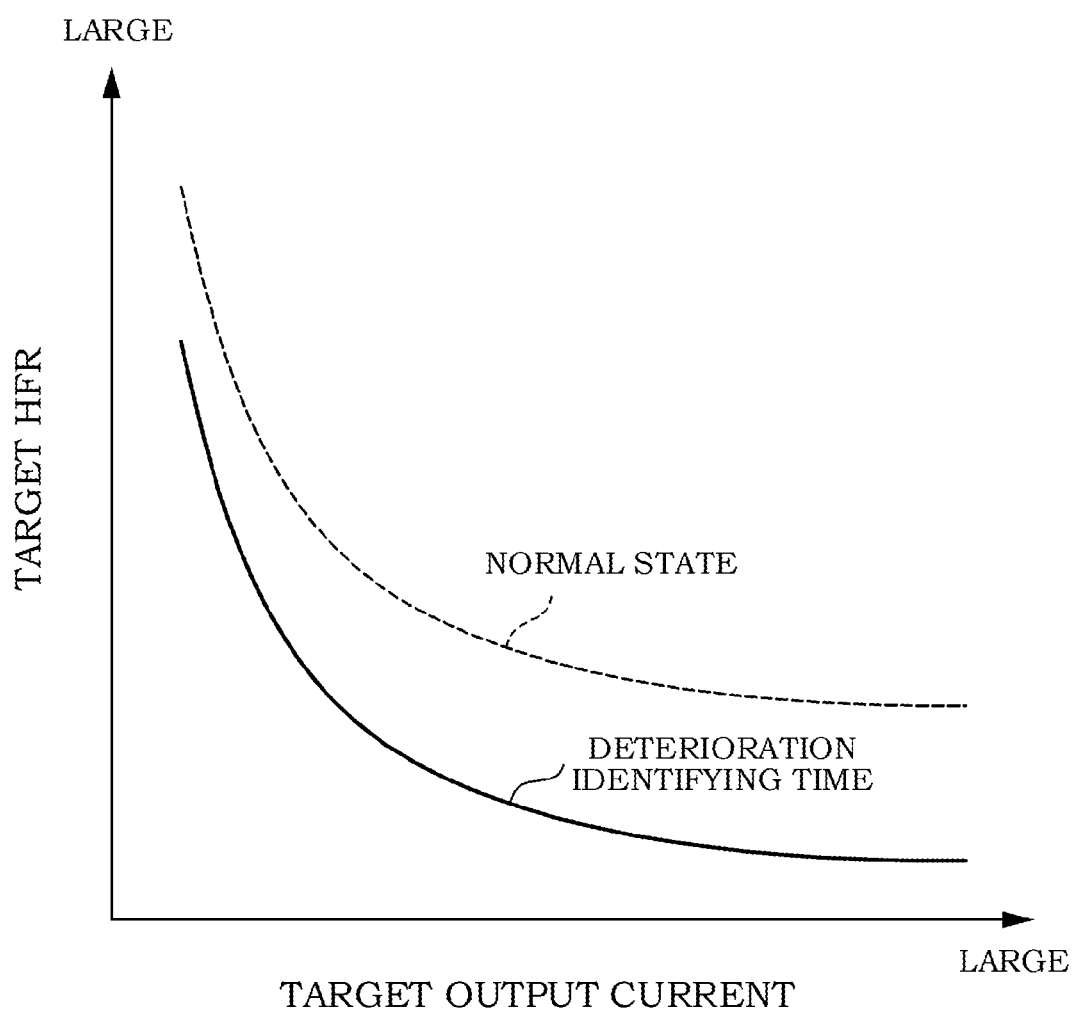
FIG. 10 is a table used when the target HFR for identifying deterioration on the basis of an output current.

At Step S44, the controller 5 refers to a table of FIG. 10 to calculate the target HFR for deterioration identification on the basis of the output current.

It should be noted that, for comparison, the table of the target HFR at the normal time shown in FIG. 4 is illustrated by a broken line in the table of FIG. 10. As shown in FIG. 10, the target HFR for deterioration identification is set so as to become smaller than the target HFR at the normal time.

At Step S45, the controller 5 controls the rotational speed of the cathode compressor 25, the opening degree of the cathode regulating valve 28, and the rotational speed of the cooling water pump (not shown in the drawings) configured to control the flow rate of the cooling water for cooling the fuel cell stack 1, so that the HFR of the fuel cell stack 1 becomes the target HFR for deterioration identification.

At Step S46, the controller 5 determines whether the HFR of the fuel cell stack 1 becomes the target HFR for deterioration identification or not. In a case where the HFR of the fuel cell stack 1 becomes the target HFR for deterioration identification, the controller 5 carries out processing at Step S47.

At Step S47, the controller 5 detects an output voltage after the HFR of the fuel cell stack 1 becomes the target HFR for deterioration identification (hereinafter, referred to as an "output voltage after the deterioration identifying processing").

At Step S48, the controller 5 determines whether a voltage change amount $\Delta V2$ is a predetermined value or more or not. The voltage change amount $\Delta V2$ denotes a voltage difference between the output voltage after the deterioration identifying processing thus detected at Step S47 and the output voltage before the deterioration identifying processing thus detected at Step S43. In a case where the voltage change amount $\Delta V2$ is the predetermined value or more, the controller 5 carries out processing at Step S49. In a case where the voltage change amount $\Delta V2$ is less than the predetermined value, the controller 5 carries out processing at Step S50.

At Step S49, the controller 5 determines that the cross leakage amount increases, and stops power generation by the fuel cell stack 1.

At Step S50, the controller 5 determines that a surface area of the catalyst in the catalyst layers 112a, 113a decreases and the catalyst is deteriorated, and limits power generation by the fuel cell stack 1.

Figure 11:
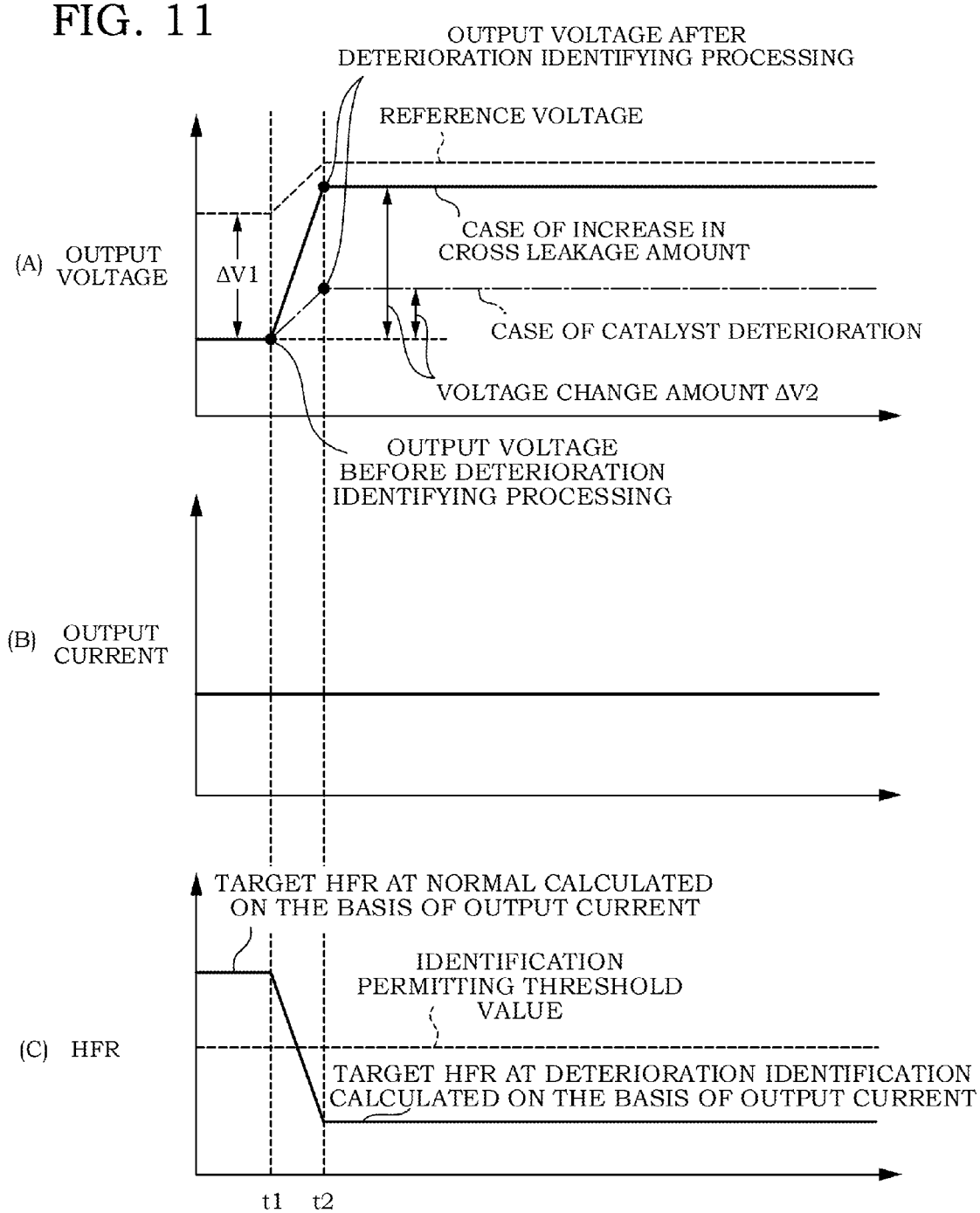
FIG. 11 is a time chart for explaining an operation of the increase detecting control for the cross leakage amount according to the first embodiment of the present invention.

FIG. 11 is a time chart for explaining an operation of the increase detecting control for the cross leakage amount according to the present embodiment.

At time t1, in a case where it is determined that the voltage drop amount ΔV1 between the reference voltage and the output voltage becomes the deterioration determining threshold value or more in a state where the fuel cell stack 1 generates electric power, it is determined whether or not the HFR of the fuel cell stack 1 is the identification permitting threshold value or more.

In this time chart, at time t1, the HFR of the fuel cell stack 1 becomes the identification permitting threshold value or more. For that reason, the output current is maintained to the output current at the time t1 after the time t1, and the output voltage at the time t1 is stored as the output voltage before the deterioration identifying processing.

Then, the target HFR for deterioration identification is calculated on the basis of the output current at the time of the time t1 by referring to the table of FIG. 10, and the HFR of the fuel cell stack 1 is feedback-controlled toward the target HFR for deterioration identification.

At time t2, in a case where it is determined that the HFR of the fuel cell stack 1 becomes the target HFR for deterioration identification, it is determined whether a voltage difference between the output voltage after the deterioration identifying processing, which is an output voltage at that time, and the output voltage before the deterioration identifying processing, that is, the voltage change amount ΔV2 is the predetermined value or more or not.

Then, in a case where the voltage change amount ΔV2 is the predetermined value or more, it is determined that a factor that the voltage drop amount ΔV1 becomes the deterioration determining threshold value or more is based on a fact that the cross leakage amount increases due to generation of a hole in the electrolyte membrane 111. On the other hand, in a case where the voltage change amount ΔV2 is less than the predetermined value, it is determined that the factor that the voltage drop amount ΔV1 is the deterioration determining threshold value or more is based on a decrease in the surface area of the catalyst in the catalyst layers 112a, 113a.

This is because of the following reasons. As shown in FIG. 11(A) by a solid line, in a case where the factor, by which the voltage drop amount ΔV1 becomes the deterioration determining threshold value or more, is due to the increase in the cross leakage amount by generating a hole in the electrolyte membrane 111, the HFR of the fuel cell stack 1 is controlled to the target HFR for deterioration identification, and the electrolyte membrane 111 swells to close the hole, whereby the cross leakage amount decreases. Therefore, this is because the output voltage rises to the vicinity of the reference voltage, and the voltage change amount ΔV2 becomes the predetermined value or more.

On the other hand, as shown in FIG. 11(A) by a dashed line, in a case where the factor, by which the voltage drop amount ΔV1 becomes the deterioration determining threshold value or more, is due to the decrease in the surface area of the catalyst in the catalyst layers 112a, 113a, the humidity of the electrolyte membrane 111 becomes larger by controlling the HFR of the fuel cell stack 1 to the target HFR for deterioration identification, the output voltage rises to the same extent of the reference voltage. However, the rise width is small compared with the increase in the cross leakage amount, the voltage change amount ΔV2 is less than the predetermined value.

Next, effects by the increase detecting control of the cross leakage amount according to the present embodiment will be described with reference to FIG. 12 and FIG. 13.

Figure 12:
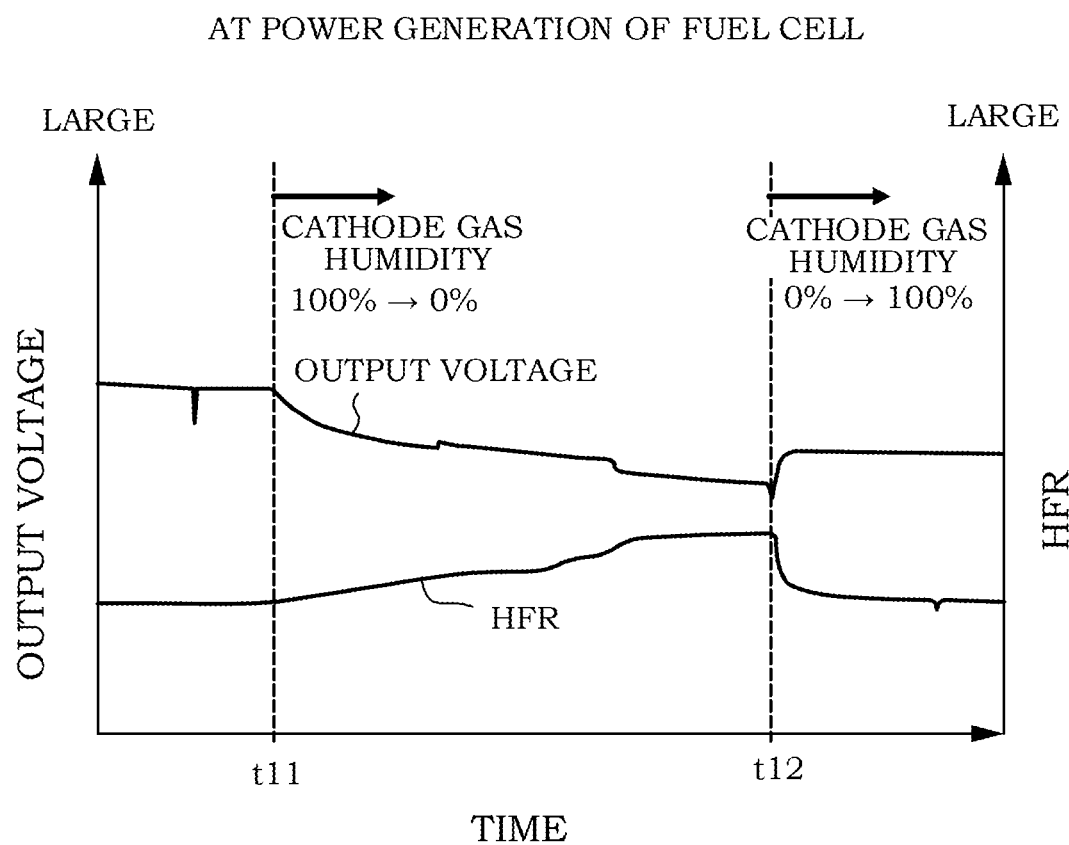
FIG. 12 is experimental results showing a change in an output voltage when the electrolyte membrane is changed from a dry state to a wet state while maintaining an output current at the time of power generation of a fuel cell by using the fuel cell in which a hole is generated in the electrolyte membrane, and a change in the output voltage when the electrolyte membrane is conversely changed from the wet state to the dry state.

FIG. 12 is experimental results showing a change in an output voltage when the electrolyte membrane 111 is changed from a dry state to a wet state while maintaining an output current at the time of power generation of the fuel cell 10 by using the fuel cell 10 in which a hole is generated in the electrolyte membrane, and a change in the output voltage when the electrolyte membrane 111 is conversely changed from the wet state to the dry state.

As shown in FIG. 12, when the humidity of the cathode gas is changed from 100% to 0% at time t11 and the electrolyte membrane 111 is changed from the wet state to the dry state, the hole that was closed due to swelling of the electrolyte membrane 111 is gradually opening. Therefore, the output voltage is being lowered.

On the other hand, when the electrolyte membrane 111 is changed from the thy state to the wet state at time t12 by changing the humidity of the cathode gas from 0% to 100%, the hole is closed due to swelling of the electrolyte membrane 111. Therefore, the output voltage rises.

At this time, in a case where a rate of change in the output voltage when the electrolyte membrane 111 is changed from the wet state to the thy state at time t11 is compared with a rate of change in the output voltage when the electrolyte membrane 111 is changed from dry state to the wet state at time t12, it is seen that the rate of change in the output voltage when to change from the dry state to the wet state is larger than the other. Namely, at the time of power generation of the fuel cell 10, like the present embodiment, it is possible to complete the determination in a short time by determining whether the cross leakage amount increases or not in view of a change in the output voltage when the electrolyte membrane 111 is changed from the dry state to the wet state.

Figure 13:
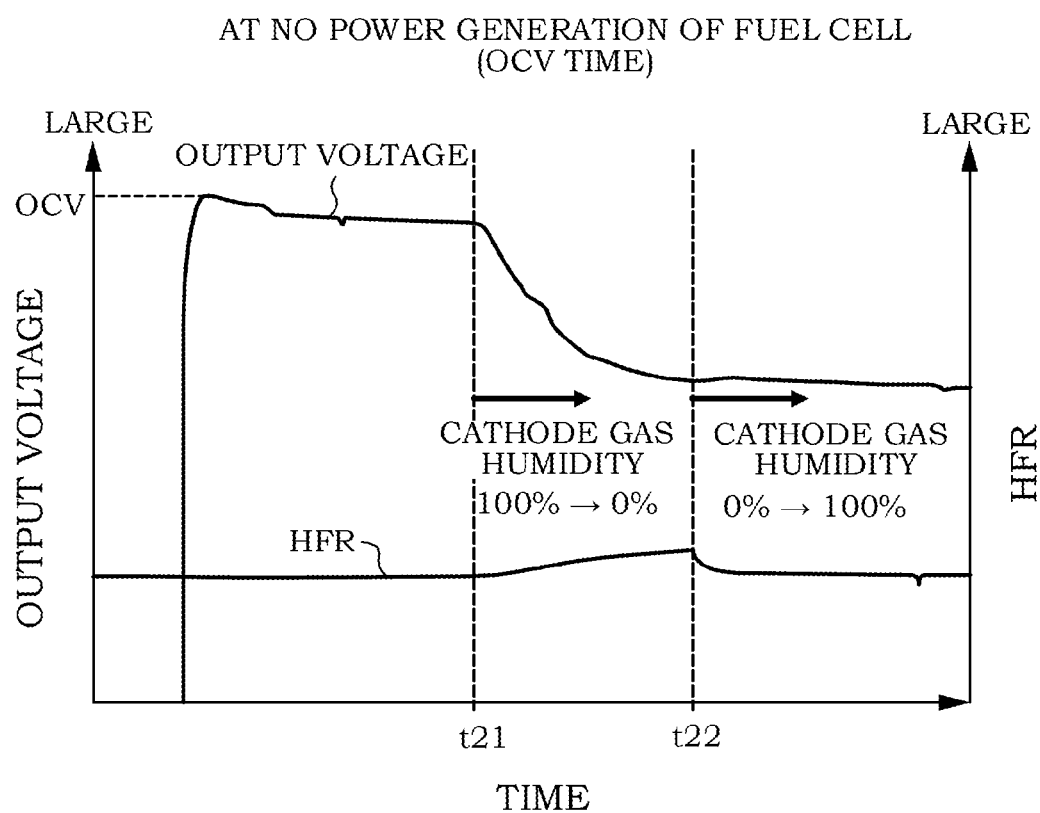
FIG. 13 is experimental results showing a change in the output voltage when the electrolyte membrane is changed from the dry state to the wet state at the time of no power generation of the fuel cell (OCV time) by using the fuel cell in which a hole is generated in the electrolyte membrane, and a change in the output voltage when the electrolyte membrane is conversely changed from the wet state to the dry state.

FIG. 13 is experimental results showing a change in the output voltage when the electrolyte membrane 111 is changed from the dry state to the wet state at the time of no power generation of the fuel cell 10 (OCV time) by using the fuel cell 10 in which a hole is generated in the electrolyte membrane 111, and a change in the output voltage when the electrolyte membrane 111 is conversely changed from the wet state to the thy state.

As well as FIG. 12, in FIG. 13, the electrolyte membrane 111 is changed from the wet state to the thy state at time t21 by changing humidity of the cathode gas from 100% to 0%. Further, the electrolyte membrane 111 is changed from the dry state to the wet state at time t22 by changing the humidity of the cathode gas from 0% to 100%.

As shown in FIG. 13, the rate of change of the output voltage when the electrolyte membrane 111 is changed from the wet state to the dry state at time t21 during no power generation of the fuel cell 10 becomes larger than the rate of change of the output voltage when to change in the similar manner at time t11 during power generation of the fuel cell 10 in FIG. 12 described above.

However, the rate of change of the output voltage when the electrolyte membrane 111 is changed from the wet state to the thy state at time t21 during no power generation of the fuel cell 10 is smaller than the rate of change of the output voltage when the electrolyte membrane 111 is changed from the dry state to the wet state at time t12 during power generation of the fuel cell 10 in FIG. 12 described above.

Further, as shown in FIG. 13, the output voltage is hardly changed at time t22 during no power generation of the fuel cell 10 even though the electrolyte membrane 111 is changed from the dry state to the wet state. For that reason, it is impossible to determine whether the cross leakage amount increases or not in view of a change in the output voltage when the electrolyte membrane 111 is changed from the dry state to the wet state at the time of no power generation of the fuel cell 10.

Therefore, like the present embodiment, it is determined whether the cross leakage amount increases or not on the basis of a change in the output voltage at that time by changing the electrolyte membrane 111 from the dry state to the wet state when an electric power is generated in the fuel cell stack 1. This makes it possible to carry out the determination during an operation of the fuel cell system, and it is possible to complete the determination in a short time. For that reason, it is possible to detect the increase in the cross leakage amount early.

Namely, according to the present embodiment, the humidity of the electrolyte membrane is increased when the fuel cell stack 1 generates an electric power, and it is determined whether the cross leakage amount increases or not on the basis of the change in the output voltage at that time. In a case where the humidity of the electrolyte membrane is increased during power generation of the fuel cell stack 1 and the cross leakage amount increases, the output voltage is changed more quickly than the change in the open circuit voltage when the humidifying amount of the reactant gas is lowered like the conventional example. For that reason, the determination whether the cross leakage amount increases or not can be carried out during the operation of the fuel cell system, and the determination can be completed in a short time compared with the conventional example.

Further, in a case where the fuel cell stack 1 is used as a power source for a vehicle, the target output current of the fuel cell stack 1 frequently varies during the operation of the fuel cell system 100. For that reason, humidity of the electrolyte membrane 111 optimum for power generation also varies frequently. In a case where an increase in the cross leakage amount is to be detected during the operation of the fuel cell system 100, there is need to carry out the detection in a short time. According to the present embodiment, it is possible to detect an increase in the cross leakage amount in a short time during the operation of the fuel cell system 100. Therefore, it is particularly possible to use the fuel cell system 100 of the present invention appropriately as a fuel cell system for a vehicle for which a load variation fluctuates.

Further, in the present embodiment, when the HFR of the fuel cell stack 1 is the predetermined identification permitting threshold value or more, the electrolyte membrane 111 is changed from the dry state to the wet state, and it is determined whether the cross leakage amount increases or not. Namely, provided that the humidity of the electrolyte membrane 111 is the predetermined threshold value or more, it is determined whether the cross leakage amount increases nor not. Thus, in the present embodiment, in a case where the humidity of the electrolyte membrane 111 is small, the electrolyte membrane 111 becomes dry and a hole is generated in the electrolyte membrane 111, it is determined whether the cross leakage amount increases or not after the humidity of the electrolyte membrane 111 makes large in a state that the hole is not closed.

In a case where the HFR of the fuel cell stack 1 is less than the identification permitting threshold value, the electrolyte membrane 111 has already swelled, the hole is closed to the extent, and a change in the output voltage becomes smaller that when the humidity is changed. For that reason, there is a fear that it is impossible to accurately determine by which factor the electrolyte membrane 111 is deteriorated. In contrast, by changing the electrolyte membrane 111 from the dry state to the wet state when the HFR of the fuel cell stack 1 becomes the predetermined identification permitting threshold value like the present embodiment, it is possible to accurately determine whether the cross leakage amount increases or not.

Further, in the present embodiment, when the voltage drop amount $\Delta V1$ is the predetermined deterioration determining threshold value or more, the electrolyte membrane 111 is changed from the dry state to the wet state, and it is determined whether the cross leakage amount increases or not. Namely, in a case where the output voltage of the fuel cell stack 1 is lowered, it is determined whether the cross leakage amount increases or not.

In the present embodiment, when the electrolyte membrane 111 is changed from the dry state to the wet state, the HFR of the fuel cell stack 1 is controlled to the target HFR for deterioration identification that is lower than the target HFR at the normal time.

Here, in order to ensure a starting performance below a freezing point, the water content in the electrolyte membrane 111 at the time of starting below the freezing point is kept low by controlling the HFR of the fuel cell stack 1 to the target HFR at the normal time according to the target output current. There is a fear that the starting performance below the freezing point is deteriorated in a case where the humidity of the electrolyte membrane 111 is increased frequently in order to detect an increase in the cross leakage amount. Thus, by carrying out the detection in a case where there is a high possibility that the cross leakage amount increases, it is possible to suppress the water content in the electrolyte membrane 111 from increasing in an unnecessary manner, and this makes it possible to suppress deterioration of the starting performance below the freezing point.

Further, in the present embodiment, in a case where the voltage change amount $\Delta V2$ of the output voltage when the electrolyte membrane 111 is changed from the dry state to the wet state while maintaining the output current constant is the predetermined value or more, it is determined that the factor of voltage drop from the reference voltage is due to the increase in the cross leakage amount. In a case where the voltage change amount $\Delta V2$ is less than the predetermined value, it is determined that the factor of voltage drop from the reference voltage is due to deterioration of the catalyst. Namely, humidity of the electrolyte membrane 111 is set to become larger than humidity at a normal time while controlling the generated electric power of the fuel cell stack 1 constant. Then, in a case where the change amount of the output voltage at that time is the predetermined value or more, it is determined that the cross leakage amount increases. In a case where the change amount of the output voltage at that time is less than the predetermined value, it is determined that the catalyst is deteriorated.

This makes it possible to identify the factor of the voltage drop due to deterioration of the fuel cell stack 1 as either the increase in the cross leakage amount or deterioration of the catalyst.

Second Embodiment

Next, a second embodiment of the present invention will be described. The present embodiment is different from the first embodiment in the content of the deterioration identifying processing. Hereinafter, explanation will be made by focusing the difference. It should be noted that components serving as the similar functions in the first embodiment described above are denoted by the same reference numerals in the following embodiment, and the overlapping explanation will be omitted appropriately.

In the first embodiment, by controlling the HFR to the target HFR for deterioration identification calculated by referring to the table of FIG. 10 while maintaining the output current constant, the electrolyte membrane 111 is changed from the dry state to the wet state.

In contrast, in the present embodiment, the HFR is lowered in accordance with the table of FIG. 4 by increasing the output current, and the electrolyte membrane 111 is thereby changed from the dry state to the wet state. Then, it is identified whether the cross leakage amount increases or not on the basis of a change in the output voltage at that time. Hereinafter, the deterioration identifying processing according to the present embodiment will be described.

Figure 14:
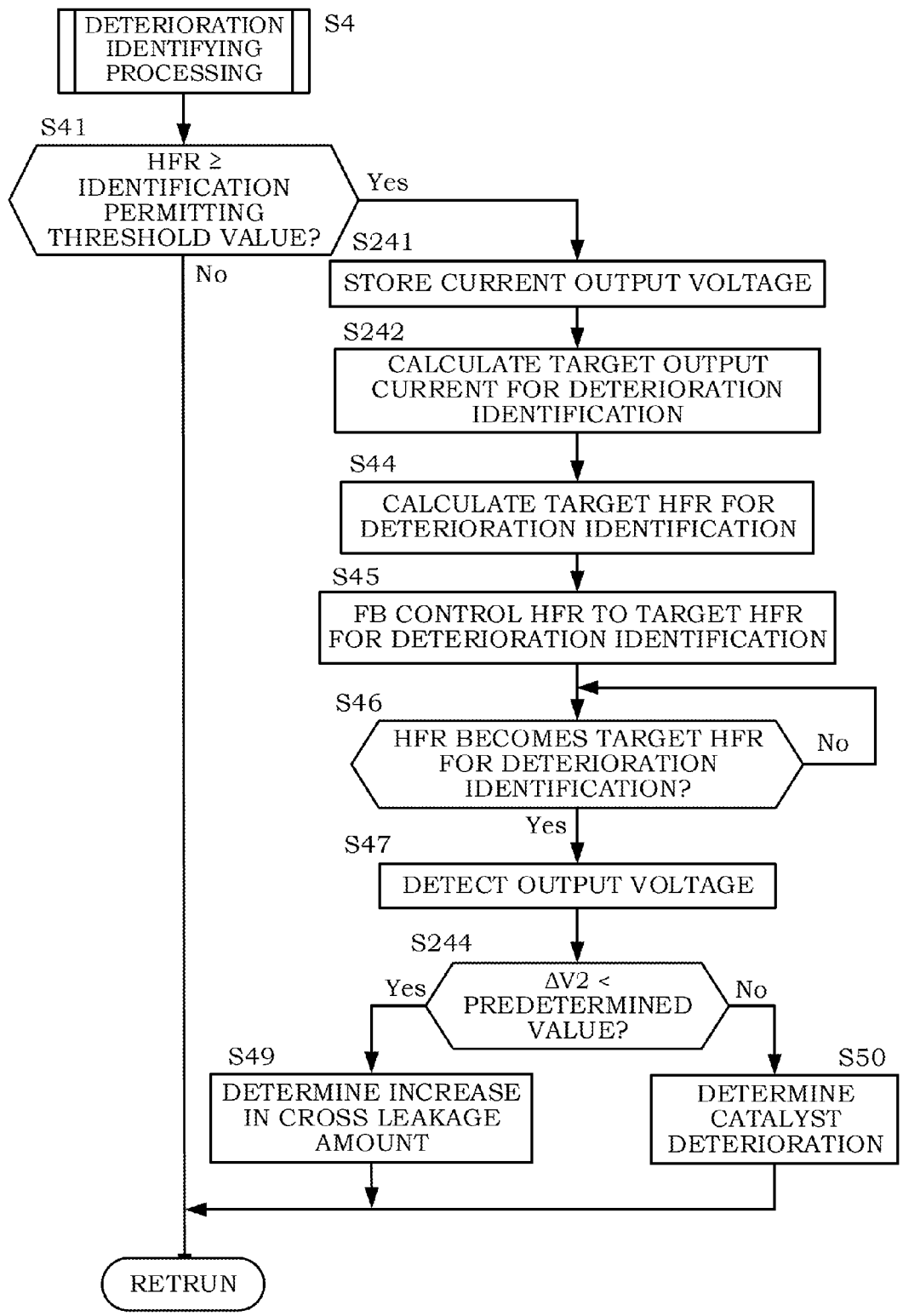
FIG. 14 is a flowchart for explaining the content of deterioration identifying processing according to a second embodiment of the present invention.

FIG. 14 is a flowchart for explaining the content of deterioration identifying processing according to the present embodiment.

At Step S241, the controller 5 detects a current output voltage, and stores the detected current output voltage as the output voltage before the deterioration identifying processing.

At Step S242, the controller 5 adds a predetermined value to the calculated target output current of the fuel cell stack 1 on the basis of a current operation state of the fuel cell system, and calculates the target output current for deterioration identification. In this regard, when the output current of the fuel cell stack 1 is controlled to the target output current for deterioration identification, a predetermined excess value of the generated electric power is charged in the battery 45.

At Step S243, the controller 5 refers to the table of FIG. 4 to calculate the target HFR for deterioration identification on the basis of the target output current for deterioration identification.

At Step S244, the controller 5 determines whether the voltage change amount $\Delta V2$, which is the voltage difference between the output voltage after the deterioration identifying processing thus detected at Step S47 and the output voltage before the deterioration identifying processing thus detected at Step S241, is less than a predetermined value or not. In a case where the voltage change amount $\Delta V2$ is less than the predetermined value, the controller 5 carries out the processing at Step S49. In a case where the voltage change amount $\Delta V2$ is the predetermined value or more, the controller 5 carries out the processing at Step S50.

Figure 15:
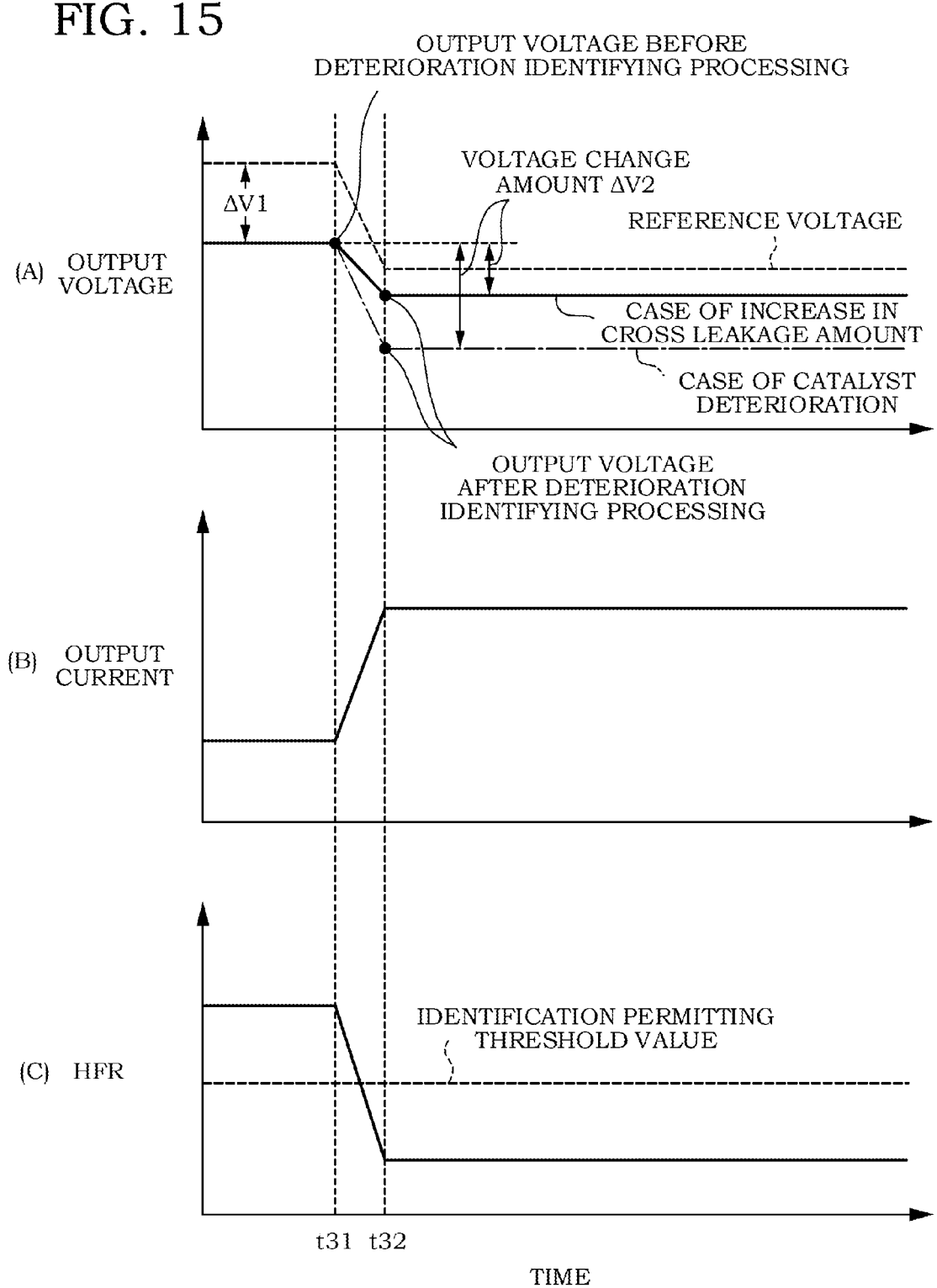
FIG. 15 is a time chart for explaining an operation of an increase detecting control for the cross leakage amount according to the second embodiment of the present invention.

FIG. 15 is a time chart for explaining an operation of an increase detecting control for the cross leakage amount according to the present embodiment.

In a case where it is determined at time t31 that the voltage drop amount $\Delta V1$ becomes the deterioration determining threshold value or more in a state where the fuel cell stack 1 generates an electric power, it is determined whether or not the HFR of the fuel cell stack 1 is the identification permitting threshold value or more.

In this time chart, the HFR of the fuel cell stack 1 becomes the identification permitting threshold value or more at time t31. For that reason, the output voltage at time t31 is stored as the output voltage before the deterioration identifying processing.

Then, one obtained by adding a predetermined value to the target output current at time t31 is calculated as the target output current for deterioration identification, and the output current of the fuel cell stack 1 is controlled to the target output current for deterioration identification. Further, the target the HFR for deterioration identification is calculated on the basis of the target output current for deterioration identification, the HFR of the fuel cell stack 1 is feedback-controlled toward the target HFR for deterioration identification.

In a case where it is determined at time t32 that the HFR of the fuel cell stack 1 becomes the target HFR for deterioration identification, it is determined whether a voltage difference between the output voltage after the deterioration identifying processing that is the output voltage at that time and the output voltage before the deterioration identifying processing, that is, the voltage change amount $\Delta V2$ is less than a predetermined value or not.

Then, in a case where the voltage change amount $\Delta V2$ is less than the predetermined value, it is determined that the factor, by which the voltage drop amount $\Delta V1$ becomes the deterioration determining threshold value or more, is due to the increase in the cross leakage amount caused by generation of a hole in the electrolyte membrane 111. On the other hand, in a case where the voltage change amount $\Delta V2$ is the predetermined value or more, it is determined that the factor, by which the voltage drop amount $\Delta V1$ becomes the deterioration determining threshold value or more, it is determined that the factor is due to a decrease in the surface area of the catalyst in the catalyst layers 112a, 113a.

This is because of the following reasons. As shown in FIG. 15(A) by a solid line, in a case where the factor of the voltage drop is due to the increase in the cross leakage amount, a hole in the electrolyte membrane 111 is closed by changing the electrolyte membrane 111 from the dry state to the wet state, whereby the cross leakage amount decreases. Therefore, a drop width of the output voltage becomes smaller, and the voltage change amount $\Delta V2$ becomes less than the predetermined value.

On the other hand, as shown in FIG. 15(A) by a dashed line, in a case where the factor of voltage drop is due to deterioration of the catalyst, the catalyst surface area cannot be returned to the state before deterioration even though the electrolyte membrane 111 is changed from the dry state to the wet state. Therefore, the output voltage drops (or is lowered) largely by increased amount of the output current, whereby the voltage change amount $\Delta V2$ becomes the predetermined value or more.

According to the present embodiment explained above, by increasing the generated electric power of the fuel cell stack 1, the humidity of the electrolyte membrane 111 is increased. In a case where the change amount of the output voltage at that time is less than the predetermined value, it is determined that the cross leakage amount increases. In a case where the change amount of the output voltage at that time is the predetermined value or more, it is determined that the catalyst is deteriorated. This also makes it possible to achieve the similar effects to those in the first embodiment. In addition, since there is no need to create the table (FIG. 10) for calculating the target HFR for deterioration identification, it is possible to reduce a work load.

As described above, although the embodiments of the present invention have been explained, the above embodiments merely illustrate a part of examples of application of the present invention, and it does not mean that a technical scope of the present invention is limited to a specific configuration of each of the embodiments described above.

For example, in the first embodiment described above, it may be configured so that an output voltage of one piece of the fuel cells 10 constituting the fuel cell stack 1 is detected in place of the output voltage of the fuel cell stack 1 and a voltage variation in one fuel cell 10 is used. This makes it possible to accurately detect an increase in the cross leakage amount even in a case where the increase in the cross leakage amount occurs in only one of the fuel cells 10. Moreover, it may also be configured so that an output voltage for plural pieces of the fuel cells 10 is detected in place of one piece and a voltage variation thereof is used.

Further, in the second embodiment described above, one obtained by adding the predetermined value to the target output current is calculated as the target output current for deterioration identification when the deterioration identifying processing is carried out. However, the present invention is not limited to such a method. The deterioration identifying processing may also be carried out when the accelerator operating amount increases and the target output current of the fuel cell stack 1 increases.

The invention claimed is:

1. A fuel cell system adapted to generate an electric power by supplying an anode gas and a cathode gas to a fuel cell, the fuel cell system comprising:
an external load connected to the fuel cell;
a voltage sensor configured to detect an output voltage of the fuel cell; and
a controller programmed to:
adjust the generated electric power of the fuel cell in accordance with electric power consumption of the external load;
control humidity of an electrolyte membrane in the fuel cell on the basis of the generated electric power of the fuel cell;
increase the humidity of the electrolyte membrane when the fuel cell generates the electric power; and
determine whether a cross leakage amount increases or not on the basis of a voltage difference between an output voltage detected by the voltage sensor before the humidity of the electrolyte membrane is increased and an output voltage detected by the voltage sensor after the humidity of the electrolyte membrane is increased,
wherein the controller is programmed to start the determination in a case where the humidity of the electrolyte membrane is less than a predetermined threshold value.

2. The fuel cell system according to claim 1,
wherein the controller is programmed to increase the humidity of the electrolyte membrane so as to become larger than humidity controlled on the basis of the generated electric power of the fuel cell while controlling an output current of the fuel cell so as to be constant,
wherein the controller is programmed to determine that the cross leakage amount increases in a case where a change amount of the voltage difference is a predetermined value or more, and
wherein the controller is programmed to determine that a catalyst is deteriorated in a case where the voltage difference is less than the predetermined value.

3. The fuel cell system according to claim 1,
wherein the controller is programmed to increase the humidity of the electrolyte membrane by increasing an output current of the fuel cell,
wherein the controller is programmed to determine that the cross leakage amount increases in a case where the voltage difference is less than a predetermined value, and
wherein the controller is programmed to determine that a catalyst is deteriorated in a case where the voltage difference is the predetermined value or more.

4. A fuel cell powered vehicle on which the fuel cell system according to claim 1 is mounted.

5. A fuel cell system adapted to generate an electric power by supplying an anode gas and a cathode gas to a fuel cell, the fuel cell system comprising:
an external load connected to the fuel cell;
a voltage sensor configured to detect an output voltage of the fuel cell; and
a controller programmed to:
adjust the generated electric power of the fuel cell in accordance with electric power consumption of the external load;
control humidity of an electrolyte membrane in the fuel cell on the basis of the generated electric power of the fuel cell;
increase the humidity of the electrolyte membrane when the fuel cell generates the electric power;
determine whether a cross leakage amount increases or not on the basis of a voltage difference between an output voltage detected by the voltage sensor before the humidity of the electrolyte membrane is increased and an output voltage detected by the voltage sensor after the humidity of the electrolyte membrane is increased; and
determine whether the output voltage of the fuel cell drops or not on the basis of a reference voltage defined in advance in accordance with an output current of the fuel cell and the detected output voltage,
wherein the controller is programmed to start the determination whether a cross leakage amount increases or not in a case where the output voltage of the fuel cell drops.

6. The fuel cell system according to claim 5,
wherein the controller is programmed to increase the humidity of the electrolyte membrane by increasing an output current of the fuel cell,
wherein the controller is programmed to determine that the cross leakage amount increases in a case where the voltage difference is less than a predetermined value, and
wherein the controller is programmed to determine that a catalyst is deteriorated in a case where the voltage difference is the predetermined value or more.

7. A fuel cell powered vehicle on which the fuel cell system according to claim 5 is mounted.

8. The fuel cell system according to claim 5,
wherein the controller is programmed to increase the humidity of the electrolyte membrane so as to become larger than humidity controlled on the basis of the generated electric power of the fuel cell while controlling an output current of the fuel cell so as to be constant,
wherein the controller is programmed to determine that the cross leakage amount increases in a case where the voltage difference is a predetermined value or more, and
wherein the controller is programmed to determine that a catalyst is deteriorated in a case where the voltage difference is less than the predetermined value.

* * * * *